United States Patent [19]

Zehndbauer et al.

[11] Patent Number: 5,098,205
[45] Date of Patent: Mar. 24, 1992

[54] OPEN-END SPINNING DEVICE

[75] Inventors: Alfons Zehndbauer, Wettstetten; Josef Breitenhuber, Buxheim, both of Fed. Rep. of Germany

[73] Assignee: Schubert & Salzer Maschinenfabrik Aktiengesellschaft, Ingolstadt, Fed. Rep. of Germany

[21] Appl. No.: 626,901

[22] Filed: Dec. 13, 1990

[30] Foreign Application Priority Data

Dec. 25, 1989 [DE] Fed. Rep. of Germany ....... 3942612

[51] Int. Cl.⁵ ............................................. F16C 32/06
[52] U.S. Cl. .................................. 384/124; 384/121; 384/124; 384/425; 384/902; 384/907
[58] Field of Search ............... 384/124, 121, 425, 902, 384/907, 100

[56] References Cited

U.S. PATENT DOCUMENTS

| | | | |
|---|---|---|---|
| 4,371,220 | 2/1983 | Brucher | 384/902 |
| 4,385,845 | 5/1983 | Hoshino | 384/425 |
| 4,636,096 | 1/1987 | Bonello | 384/425 |
| 4,798,476 | 1/1989 | Sakatani et al. | 384/121 |

Primary Examiner—Lenard A. Footland
Attorney, Agent, or Firm—Dority & Manning

[57] ABSTRACT

An open-end spinning device with a spinning rotor (1) which is supported via its shaft (11) by support disks (4) and upon which an axially acting force is exerted is provided for its axial support with an aerostatic thrust bearing (6) with a bearing plate which interacts with the end of the shaft. The escape of air into the bearing gap takes place through the bearing plate (63) which together with the end of the rotor shaft (11) constitutes a low-friction pairing of materials.

26 Claims, 3 Drawing Sheets

OPEN-END SPINNING DEVICE

BACKGROUND OF THE INVENTION

The instant invention relates to an open-end spinning device.

With open-end spinning devices of a similar type it is known that the shaft bears in axial direction on a step bearing. This is shown for example in DE-AS 24 12 004. The thrust bearings made in this manner have the advantage that the thrust bearing is put under considerable mechanical stress due to the metallic contact with the rapidly rotating rotor shaft and wear out rapidly. No high rotational speed can be used after a sufficiently long period of time.

In other embodiments of an open-end spinning device of a similar type (DE-OS 23 17 306, DE 35 23 116 A1) the shaft bears axially against a rotatably supported ball. These designs have the disadvantage that in order to ensure that the ball also rotates slowly and in order to reduce wear, the thrust bearing must be lubricated. Because of the high speed of the rotor the lubricant is brought out of the thrust bearing, and this leads to soiling of the spinning device and of the spun goods. Furthermore such a bearing is expensive and requires a high degree of maintenance. Constant control of the oil level and replenishing lost oil is necessary, and for this the spinning device must be stopped. This causes additional costs. At high rotational speeds, e.g. those up to above 12,000 r.p.m., the above-mentioned problems are aggravated. A further disadvantage in open-end spinning devices of a similar type is that the axial, impetuous movements of the rotor shaft which are caused by radial impetuous load of the rotor shaft, e.g. by the drive means or by imbalance in the rotor disk, cannot be sufficiently clamped by the known thrust bearings. It may occur therefore that the spinning rotor leaves its axial position, and this leads to an interruption of the spinning process or to the spinning rotor impactly against the rotor housing.

SUMMARY OF THE INVENTION

It is the object of the instant invention to design an open-end spinning device that avoids the disadvantages of the prior art and may also be used with very high rotational speeds.

This object is attained through a new thrust bearing. Thrust bearing of spinning rotors being supported directly by means of aerostatic bearings is known. DE-OS 24 12 174 shows a directly supported spinning rotor with axially acting, aerostatic thrust bearings. DE-AS 26 16 132 shows a directly supported open-end spinning rotor which bears upon an aerostatic thrust bearing or a spiral groove bearing in combination with an aerostatic thrust bearing.

The aerostatic thrust bearings known with direct rotor bearings are however not suitable to support spinning rotors of open-end spinning devices of a similar type. In spinning devices of a similar type irregularities in the friction of the drive means or imbalance in the spinning rotor for example, cause radial impetuous loads to take impetuous effect upon the rotor shaft, said loads taking impetuous effect upon the thrust bearing. Pneumatic thrust bearing in directly supported spinning rotors are not capable of absorbing these high, impetuous axial loads.

The known open-end spinning device is improved by the embodiment according to the instant invention in that the disadvantages of known thrust bearings are avoided. In addition the function of the thrust bearing designed in according to the instant invention is practically independent of the rotational speed of the spinning rotor so that the highest speeds can be handled, and this is especially advantageous. The lack of axial attenuation in devices of a similar type is improved so that a precise, operationally secure axial guidance of the rotor shaft becomes possible. The bearing requires little maintenance and is subject to only minimal wear. The utilization according to the invention of a low-friction pairing of materials between shaft and bearing surface makes it possible to absorb even strong axial impacts of the rotor shaft through the thrust bearing, as even when the bearing gap is displaced and a contact occurs between shaft and bearing surface, such axial loads can be absorbed without damage by the thrust baring of the open-end spinning device according to the instant invention. Thanks to the low-friction configuration of the thrust bearing, minimal bearing gap may be provided, increasing the rigidity of the bearing and thereby rendering precise axial positioning of the spinning rotor possible while lowering air consumption at the same time.

A further especially advantageous embodiment of the instant invention is achieved in that the pairing of materials is abradable. This has the advantage that the two bearing surfaces adapt to each other during the break-in period of the machine. Errors in alignment which are practically unavoidable due to manufacturing tolerances are thereby compensated automatically. The two surfaces adapt to each other in parallel position, so that a uniform bearing gap is obtained which increases the bearing's load bearing capacity and minimizes air consumption. Thanks to the uniformity the bearing gap can be kept small. A small bearing gap imparts great rigidity to the bearing, and this makes displacement of the air gap in the thrust bearing through impetuous movements of the rotor shaft more difficult while economic advantages of the bearing need not be lost due to increased pressure in the bearing and therefore greater air consumption.

An especially advantageous embodiment of the invention results from the utilization of a carbon material in pairing the materials. Utilization of a steel shaft interacting with a bearing plate made of a carbon material, in particular electrographited synthetic carbon, is especially advantageous. This has the advantage of very low friction parameters. In using a shaft with a carbon material projection at the end for instance, the additional advantage is gained that when the spinning rotor is replaced, the wear part of the thrust bearing can be replaced at the same time. In that case the bearing plate is advantageously made of a wear resistant material.

In an advantageous embodiment of the invention with a choke it is possible to influence the size of the bearing gap during operation of the spinning device. In this manner the rigidity of the bearing can be determined advantageously. When the bearing gap increases during operation, the choke causes the pressure to drop immediately in the bearing gap and thereby causes the spinning rotor to return into its starting position. Furthermore the bearing uses little air.

It is especially advantageous to install the choke directly before the air outlet into the bearing gap. This produces especially great bearing rigidity while air consumption is low at the same time. The air column between choke and bearing gap which is the determining factor for the rigidity of the bearing is kept very small.

It is especially advantageous to use a tufaceous material in the choke because a good choke effect is achieved in that way. The size of the pores depends here on the cleanliness of the air used. An advantageous embodiment of a choke is achieved if at the same time it is made of a low-friction material. Bearing plate and choke can thus be made in one piece. This is advantageously possible with a carbon material.

In operation the pores of permeable bearing plates can close as a result of abrasion and prevent air from escaping. It is therefore advantageous to drill closed-end bores by means of a sharp tool into the combined choke and bearing plate, over the surface of which the air can enter the bearing gap. Clogging of the pores of the bearing surface then no longer prevents air from escaping.

The escape of air into the bearing gap is effected advantageously by means of one or several bores in the bearing plate. If one bore is used, it is advantageously located in the center of the circular bearing surface, and when several bores for the escape of air into the bearing gap are used, these are arranged on a circular line going around the center of the bearing surface. This has the advantage that the distribution of pressure in the bearing gap is more even so that the bearing can be operated with lower air pressure and therefore with lower air consumption. In order to ensure reliable operation of the thrust bearing the bores must have such diameters that they cannot become clogged due to mechanical contact between shaft and bearing surface such as may occur during the breaking-in of the bearing and when strong axial shocks are produced. Such clogging of the bores would have as a result that the escape of air would no longer be possible. When an artificial carbon is used it has been shown that it is advantageous to use a diameter of 0.6 mm for the bores. This prevents the clogging of the bores.

The length of the bores guiding air from the choke into the bearing gap should be kept as short as possible because the length of the bores greatly influences the rigidity of the bearing. When bores less than 7 mm long are used, good rigidity of the bearing is achieved and at the same time the bearing plate is stable and has a sufficiently thick wearing coat. A further advantageous embodiment of the thrust bearing is achieved by giving the surface over which the shaft is supported essentially the same diameter than the rotor shaft itself. In this manner a large bearing surface on the shaft side is obtained, and this increases the carrying capacity and at the same time gives the shaft such a configuration that it can be pulled out of the nip of the supporting disks without any resistance when the rotor is replaced.

It is especially advantageous for the diameter of the surface over which the shaft is supported is smaller than that of the shaft and for the transition to be without a jump in diameter, since this also considerably facilitates the re-introduction of the shaft after a replacement and prevents damage of the supporting disks and of the packing of the rotor housing.

Additional advantageous embodiments of the instant invention are described in the sub-claims.

The instant invention is described below though drawings in which:

BRIEF DESCRIPTION OF THE DRAWINGS

FIG. 4b is a end view of the bearing plate of FIG. 4a;

DESCRIPTION OF THE PREFERRED EMBODIMENT

Figure 1:
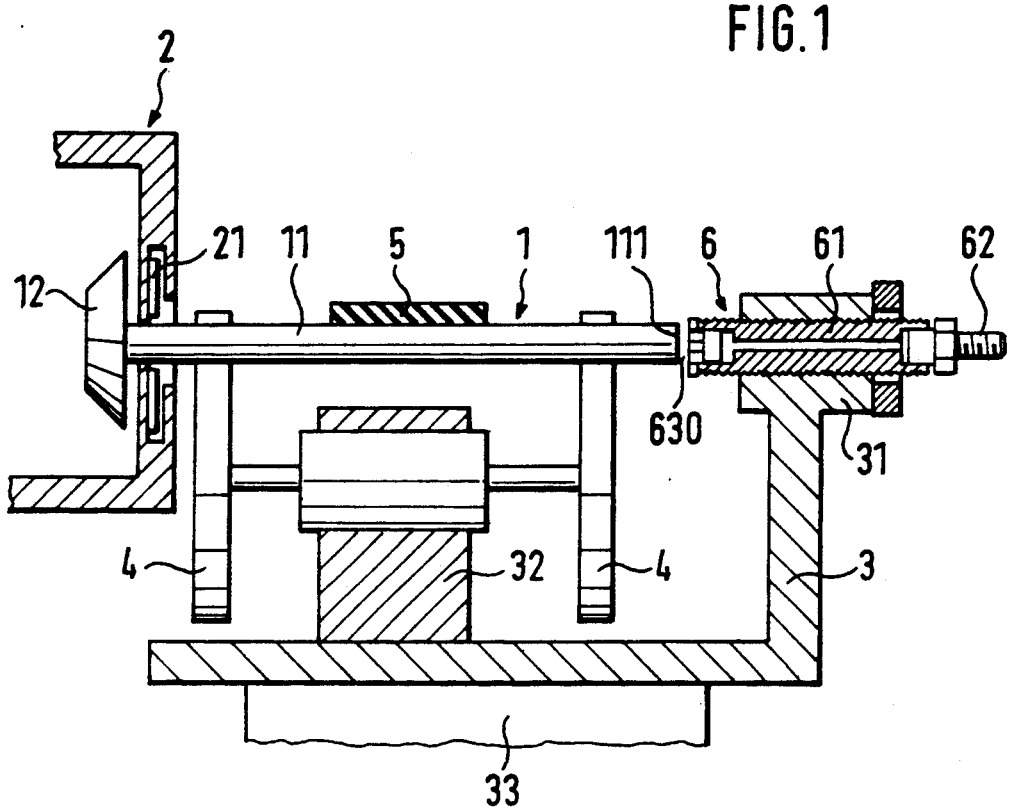
FIG. 1 is a cross sectional view of an open-end spinning device according to the instant invention.

FIG. 1 shows a section through open-end spinning device according to the invention. The basic components are the spinning rotor 1 with its shaft 11 and rotor disk 12. The rotor housing 2 with the rotor housing packing 21, the bearing block 3 with a seat 31 to receive the mounting of the supporting disks 4, the supporting disks 4 which receive the rotor shaft, the drive means 5, a tangential belt to drive the spinning rotor 1 and the thrust bearing 6 to support the rotor shaft 11. The rotor shaft 11 extends with its end supporting the rotor disk 12 into the rotor housing 2, going through the boring of the rotor housing packing 21.

The thrust bearing 6 is installed in an attachment screw 61 and faces the free end 111 of the rotor shaft 11. The seat 31 is provided for this with a threaded bore into which the attachment screw is screwed so as to be capable of being adjusted axially. A counter-screw is used to fix it in place. At the end of the attachment screw 61, connection 62 is located to feed compressed air to the thrust bearing 6 and the bearing gap 630 extends between it and the shaft end 111. An axial force is applied in a known manner on open-end spinning devices of a similar type, said force bearing on the fee end 111 of the rotor shaft 11. The axial force exerted on the rotor shaft is exerted in the open-end spinning device shown in FIG. 1 by supporting disks 4 which are placed at an angle in a known manner. It is also possible however to exert the axial force components via a drive belt extending at an angle to the rotor shaft or also via a pressure or drive disk placed at an angle. The open-end spinning device is attached on seat 33 which is part of the appertaining spinning machine.

Figure 2:
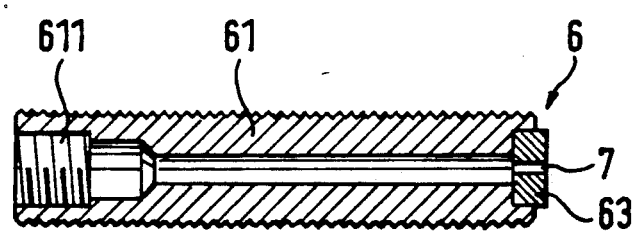
FIG. 2 is a cross sectional view of a thrust bearing designed with a central bore according to the instant invention, installed in an attachment screw.

FIG. 2 shows a section of an embodiment of an attachment screw 61 supporting the thrust bearing 6. In its end away from the spinning rotor the attachment screw is provided with bore 611 threaded inside into which a connection for the compressed-air circuit can be screwed. The attachment screw is provided with a central bore over its entire length through which air flows to the thrust bearing 6. In the embodiment of FIG. 2 the thrust bearing 6 consists of a bearing plate with a central bore 7. The diameter of the bore is 0.6 mm, and this ensures that said bore does not clog up during operation due to the abrasion of the material of which the bearing plate 63 is made. The bearing plate itself is made of a synthetic electrographited carbon. This, together with a rotor shaft made of steel constitutes a low-friction pairing of materials. At the same time this material is capable of wearing off, i.e. in order to achieve good alignment between the rotor shaft end and the bearing plate the bearing can be broken in before actual start-up. This means that the rotor shaft is polished into shape on the bearing plate 63 so that the thus produced surfaces facing each other are parallel with each other. The attachment screw 61 and the bearing plate 63 are firmly attached to each other by means of a press fit. In order to decrease the passage of air and to increase the rigidity of the bearing it is possible to provide in this embodiment of the thrust bearing for the bore 7 to have a smaller diameter at the air intake into the bore so that the air is throttled.

Figure 3:
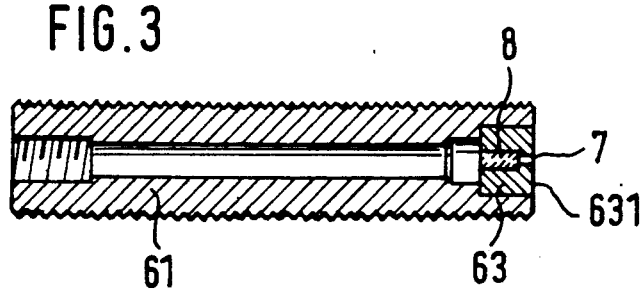
FIG. 3 is a cross sectional view shows a bearing plate with a central bore and a choke.

The attachment screw 61 in FIG. 3 has a bearing plate 63 that is similar to that of FIG. 1 which is installed in the attachment screw 61 by means of a press fit. The bearing plate 63 is also provided with a bore 7 as in the embodiment of FIG. 2. This bore 7 widens considerably on its side away from the bearing surface 631. A choke 8 is installed in this enlarged area. The choke consists of a tufaceous material with very fine pores. The air column in bore 7 after the choke 8 in direction of air flow is kept very short by this choke arrangement. This imparts great rigidity to the bearing.

Figure 4A:
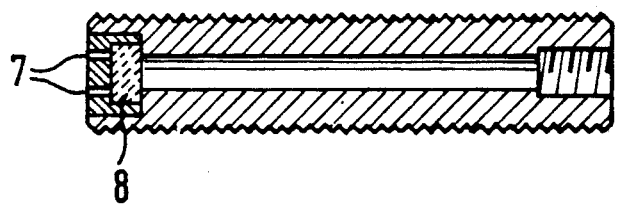
FIG. 4a is a modified form of the invention showing in cross section a bearing plate with bores arranged in a circle and with a choke.

FIG. 4a shows an attachment screw 61 and a bearing plate 63 similar to that of FIG. 3 which is installed in it. Contrary to what is shown in FIG. 3, several bores 7 are available for the escape of air into the bearing gap. Similarly as in FIG. 3, a choke 8 is provided in the bearing plate 63 here too. It is made of a tufaceous material.

Figure 4B:
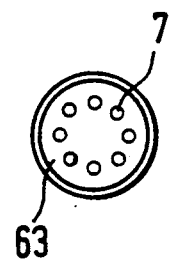

FIG. 4b shows the bearing plate 63 in a top view. The bores 7 are distributed evenly along a circular line at a distance from the center.

Figure 5:
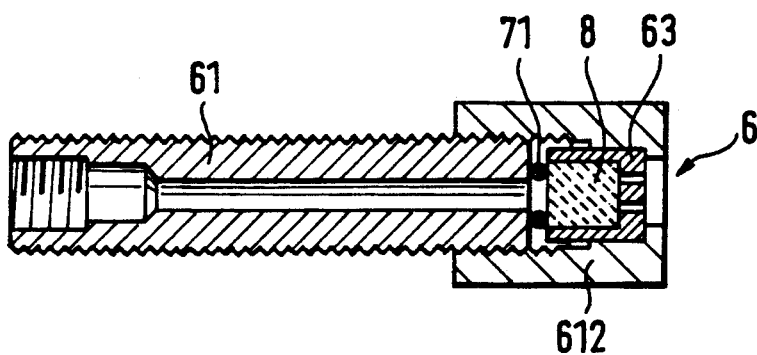
FIG. 5 is a cross sectional view of a modified attachment screw with an elastically mounted bearing plate.
Figure 6:
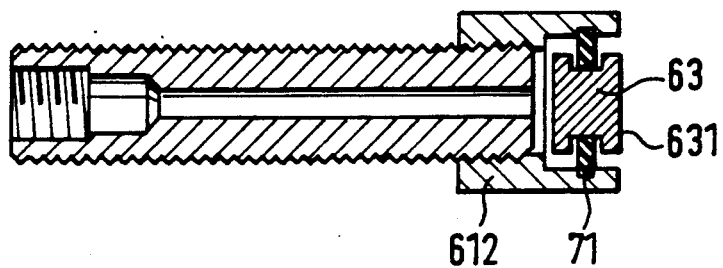
FIG. 6 is a cross sectional view of another embodiment of an elastically mounted bearing plate.

FIG. 5 shows an attachment screw 61 with a thrust baring 6 in which the bearing plate 63 is supported elastically. For this the bearing plate 63 is held against the attachment screw 61 by means of a sleeve 612. An O-ring is provided as an elastic element between the attachment screw 61 and the bearing plate 63 or the choke 8 which is built into it. The bearing plate 63 is thereby able to dampen axial shocks of the rotor shaft. A similar bearing plate 63 with damping is shown in FIG. 6. Here too the elastic element is a rubber ring 71 which is placed in a circumferential groove of bearing plate 63 and is fixed in axial direction by sleeve 612 on its exterior circumference. Here the bearing plate 63 is made of a low-friction and at the same time permeable material, e.g. synthetic carbon. The air escapes over the entire cross-section of the bearing surface 631. An additional choke is not required in this embodiment as the choking effect takes place through the pores of the material of the bearing plate.

Figure 7:
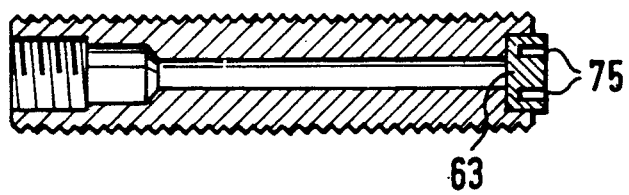
FIG. 7 is a cross sectional view of still another modified form of the invention showing a bearing plate made of a permeable material into which closed-end bores have been made.

FIG. 7 shows a thrust bearing in which the bearing plate 63 is made of a permeable and at the same time low-friction material of electrographited synthetic coal. The bearing plate acts at the same time as a choke. In order to prevent with certainty that the pores of the permeable material become clogged due to wear when the rotor shaft is in contact with the bearing plate, i.e. that the bearing plate's permeability to air is decreased, closed-end bores 75 are drilled into the bearing plate. The air escape into the bearing gap takes place over the surfaces of the closed-end bores. These are made by means of sharp tools so that the surface does not become clogged during drilling and the pores remain open. The same bore diameter as in the bearing design of FIG. 2 is selected so that clogging of the escape openings into the bearing gap is prevented.

Figure 8:
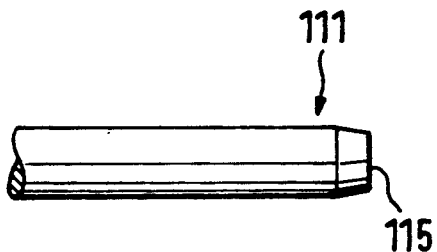
FIG. 8 is a side elevation of a conically tapered shaft end.

FIG. 8 shows an advantageously designed shaft end 111 which interacts with the bearing plate of the thrust bearing. The shaft end 111 has a plane surface 115 for this, with a diameter that is slightly smaller than the diameter of the shaft. The transition between the shaft diameter and the diameter of the surface 115 of end 111 of the shaft is as shown in FIG. 8, preferably without sudden transition. In this embodiment of the shaft end the spinning rotor can easily be pulled out of the bearing gap of the supporting disk as well as be reintroduced into same.

Figure 9:
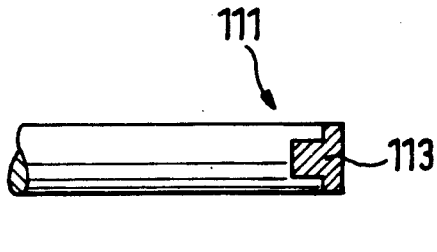
FIG. 9 is a side elevation of a modified form of the invention showing a shaft end with a projection made of a low-friction material.

FIG. 9 shows a shaft end 111 into which a projection 113 made of a low-friction material is integrated. The wearing part of the thrust bearing can be replaced simultaneously with the replacement of the spinning rotor. In that case the rotor shaft interacts advantageously with a baring plate made of a wear-resistant material.

The open-end spinning machine described here is used in spinning machines equipped with many adjoining spinning devices of the same type. To be supplied, each individual spinning device is connected to a central supply circuit for compressed air. The air pressure in the thrust bearing can be adjusted via this central circuit to be the same for all spinning stations. This ensures in a simple manner that the same conditions prevail at all spinning devices. In an improved embodiment the air pressure which is required for the individual spinning stations is determined at a spinning station equipped with a special measuring device and is adjusted centrally for all the other spinning stations. It is also advantageously possible to determine the required air pressure autonomously, e.g. over the axial position of the spinning rotor, for the supply of the thrust bearings and to control it accordingly.

It is furthermore possible to supply individual machine sides or sections of spinning machines with compressed air independently of each other in the manner described above.

The instant invention is not limited to the embodiments shown. Pairings of materials between shaft end and bearing plate which are not mentioned in the description are also covered under the instant invention. Neither is it required that the surfaces of rotor shaft end and bearing plate be plane surfaces. The instant invention applies equally for convex or stepped surfaces. A combination of thrust bearings and attachment screws is not essential for the invention. A placement of the thrust bearing directly on the bearing block 3 is also covered by the instant invention.

We claim:

1. A thrust bearing for an open-end spinning device that includes a spinning rotor having a shaft connected thereto, disks supporting said shaft, said thrust bearing bearing against a remote end of said shaft opposite the end connected to said rotor, and receiving axially acting forces exerted through said shaft comprising:

an attachment screw, a bearing plate carried in one end of said attachment screw engaging said remote end of said shaft, a duct extending through said attachment screw for receiving compressed air, said bearing plate allowing said compressed air to flow from said duct therethrough into a bearing gap provided between the remote end of said shaft and said duct, and said remote end of said shaft and said bearing plate being constructed of a low-friction pairing of materials.

2. The thrust bearing as set forth in claim 1 further comprising a choke carried in said bearing plate through which said compressed air passes.

3. The thrust bearing set forth in claim 2 wherein the choke consists of at least one bore carrying the air.

4. The thrust bearing as set forth in claim 2 wherein the choke is located immediately before the bearing plate.

5. The thrust bearing as set forth in claim 2 wherein the choke is made of the same material as the bearing plate.

6. The thrust bearing as set forth in claim 2 wherein the choke is made of permeable material.

7. The thrust bearing as set forth in claim 2 wherein the choke is made of a tufaceous material.

8. The thrust bearing as set forth in claim 1 wherein the thrust bearing is designed so that it can be shifted in axial direction within said attachment screw.

9. The thrust bearing as set forth in claim 1 wherein the thrust bearing is connected by a supply circuit to a source of compressed air which supplies an open-end spinning device with compressed air.

10. The thrust bearing as set forth in claim 9 wherein the air supply lines supplying the thrust bearing is equipped with connections for additional open-end spinning devices.

11. The thrust bearing as set forth in claim 9 further providing means for adjusting the pressure of the air supplied to the thrust bearing.

12. The thrust bearing as set forth above in claim 9 wherein means is provided for adjusting separately for each open-end spinning device the pressurized air being supplied thereto.

13. The thrust bearing as set forth in claim 9 further comprising means for adjusting the supply of air pressure to the thrust bearing as a function of the load on the thrust bearing.

14. The thrust bearing as set forth in claim 1 wherein said bearing plate has a bearing surface on the side facing the remote end of the shaft having a diameter which is essentially the same as the diameter of the shaft throughout.

15. The thrust bearing as set forth in claim 1 wherein the remote end of the shaft constituting the bearing surface has a smaller diameter than the remainder of the shaft and the diameter transmission is without jumps in diameter.

16. The thrust bearing as set forth in claim 1 wherein the bearing plate has several bores to let the air escape.

17. The thrust bearing as set forth in claim 16 wherein the bores are arranged in a circular pattern.

18. The thrust bearing as set forth in claim 16 wherein the bores are less than 7 mm long.

19. The thrust bearing as set forth in claim 16 wherein the bores have a diameter of more than 0.5 mm.

20. A thrust bearing as set forth in claim 1 wherein said bearing plate is made of permeable material.

21. The thrust bearing as set forth in claim 20 wherein the bearing plate has several closed end bores for the air to escape into the bearing gap.

22. The thrust bearing as set forth in claim 21 wherein one bore is located in the center.

23. A thrust bearing as set forth in claim 1 wherein the bearing plate is supported elastically.

24. The thrust bearing as set forth in claim 1 wherein at least one of the materials is a carbon material.

25. A thrust bearing as set forth in claim 1 wherein at least one of said materials in the pairing of materials is abraidable.

26. A thrust bearing as set forth in claim 25 further comprising a projection provided on the remote end of said shaft being made of low friction material.

* * * * *